Patented June 15, 1943

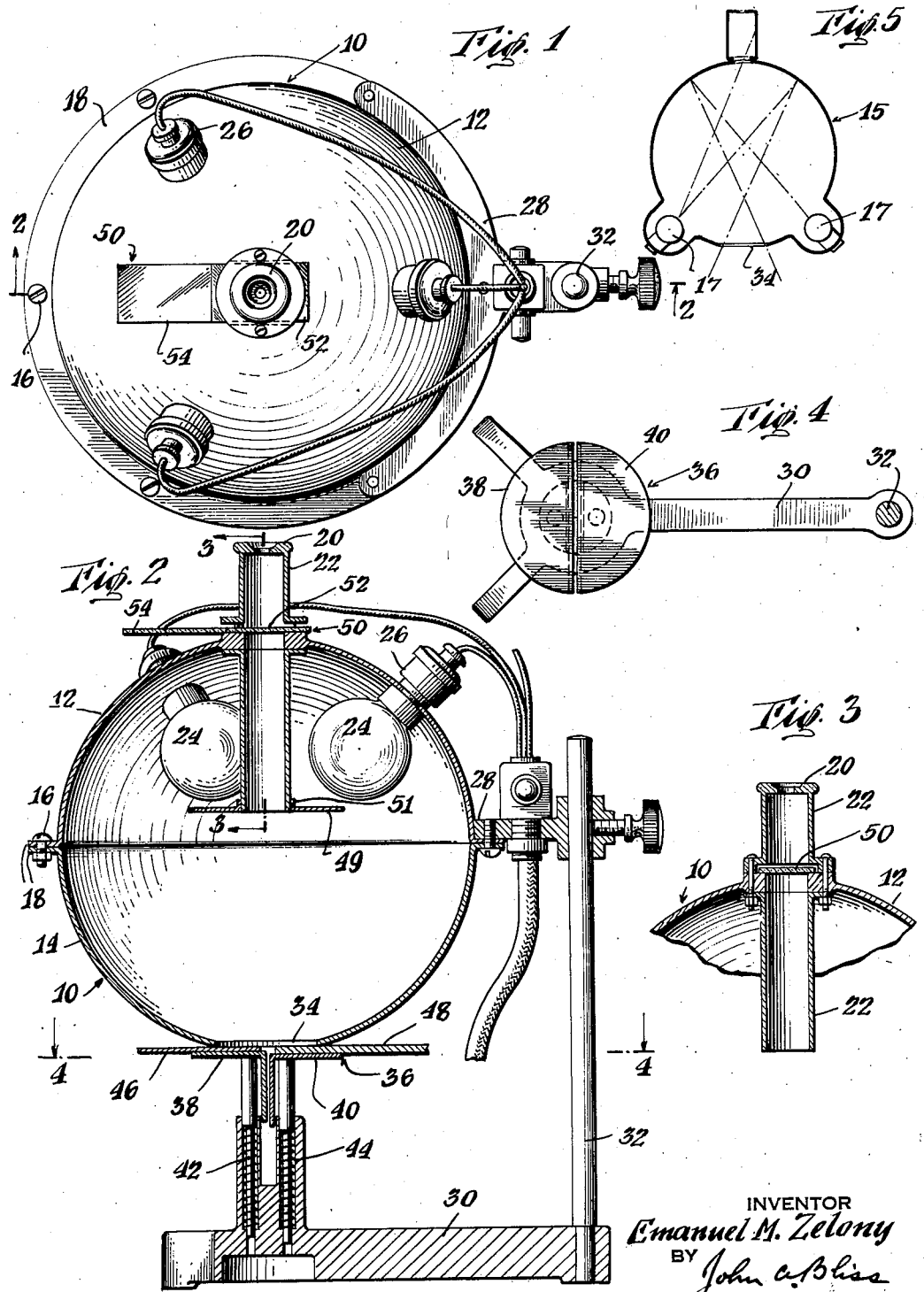

2,321,722

UNITED STATES PATENT OFFICE 2,321,722

VISUAL COLOR COMPARATOR

Emanuel M. Zelony, New York, N. Y.

Application October 4, 1940, Serial No. 359,679

5 Claims. (Cl. 88—14)

This invention relates to a new and improved visual color comparator which, due to a unique arrangement of the parts, has great efficiency, and may be fabricated by modern production methods in a cheap and economical manner.

Heretofore, there has been no visual color comparator which would permit the matching of colors, namely, standard and sample, with ease and accuracy and under standardized light conditions. Moreover, heretofore, there has been no visual color comparator which readily permitted the observation of standard and sample under daylight and artificial light conditions of equal intensity by the use of filters.

Therefore, it is an object of my invention to provide a simple and unique combination of elements which permits the visual comparison of standard and sample colors under optimum light conditions from the standpoint of the observer and which permits the observer, by means of light filters, to observe the specimens under artificial or daylight conditions, with equivalent amounts of light.

It is a further object of my invention to provide a visual color comparator in which the standard and sample are placed side by side and occupy approximately equivalent physical fields at identically the same distance from the observer and under identical conditions of lighting so that standard and sample can be, in fact, truly compared.

A further object of my invention is to arrange a visual color comparator in such manner that direct rays from the light source will not shine in the eye of the observer and also, so that the light upon the standard and sample is diffused.

The above and various other objects and advantages will be readily understood from the following description taken in connection with the accompanying drawing of preferred embodiments of the invention, in which modifications may be made without departing from the scope of the appended claims.

In the drawing,

Fig. 1 is a plan view of a visual color comparator embodying my invention;

Fig. 2 is a cross section taken on the line 2—2 of Fig. 1.

Fig. 3 is a fragmentary section taken on the line 3—3 of Fig. 2; and

Fig. 4 is a section taken on the line 4—4 of Fig. 2.

Fig. 5 is a semi-diagrammatical view of an alternate embodiment of my invention.

In these figures in which common parts are designated by common reference numerals, a visual color comparator 10 may be formed preferably generally in the shape of a sphere, as provided by two preferably semi-spherical metal shell portions 12 and 14, which latter may be coated inside with reflective white pigment and united in any convenient manner as by the bolts 16 in flange portions 18, and it will be realized that other enclosure shapes, while not so advantageous, could be utilized. At the top of portion 12, there preferably will be provided eye-port member 20 having any suitable means of attachment to member 12. Eye-port member 20 as shown, may be tubular in shape, and have therebelow a cylindrical sleeve 22 suitably attached to member 12, and serving as a shield from the direct rays of preferably three electric light bulbs identified as 24. Other suitable means of illumination can, of course, be utilized if desired and also other types of shields. The bulbs 24 will be preferably spaced equi-distantly in the upper portion of member 12 as illustrated, but it is within the purview of my invention to place the bulbs 24 in the lower half of the sphere, namely, member 14, by placing the same in recesses or suitably baffled, if desired, so that direct light rays would not strike the eye of an observer, and such an embodiment of my invention is illustrated semi-diagrammatically in Fig. 5, in which instance the color comparator is generally identified as 15, and the light bulbs as 17.

Suitable conventional electrical connection and sockets are provided for bulbs 24 and are generally identified as 26.

A suitable curved bar member or bracket means 28 is utilized to slidably connect the sphere to base member 30 and its upright rod member 32, as illustrated.

Diametrically opposite from eye-port member 20 and in line with the tubular shield 22 is arranged a preferably generally circular aperture 34 in member 14.

Below aperture 34 and in alignment therewith, is arranged a spring controlled split circular platform member generally identified as 36 having two independently retractable half-circular platform portions 38 and 40, each independently actuated and tensioned against, but retractable from, member 14 by means of respective spring members 42 and 44. It will be recognized that the platform member 36 should be of a shape and size to substantially close the aperture 34, by abutting against member 14, preferably under spring tension.

A color standard indicated as 46, in the form of fabric, paper, or other material, may be quickly placed upon half platform member 38 so as to cover the upper surface thereof, and upon the release of platform 38 the standard 46 may be arranged so as to occupy approximately one half of aperture 34 and will be tensioned thereagainst in firm position. Likewise, a color specimen 48 may be placed upon half platform member 40 in such fashion as to occupy a similar relation with edges of standard and sample preferably abutting. It will be readily understood that if the specimen, as illustrated, is thicker than the standard, due to the retractable half platform members, that the upper surfaces to be compared will be exactly at equal distance from the eye-port member 20.

A flat shield or baffle 49 may be, if desired, provided to prevent direct rays of light shining from bulbs 24 from striking highly reflective glossy surfaced standard or sample specimens, in aperture 34 in such a manner as to reflect upwardly through eye-port 20 and strike the eyes of the observer. It is preferred to have the bottom of baffle 49 colored black and the top of same white. Baffle 49 will be preferably annular in shape and have an upturned flange 51 which will frictionally fit on cylindrical sleeve 22. Baffle plate 49 should extend outwardly from sleeve 22 at least a distance equivalent to the diameter of sleeve 22 thereby preventing entry of direct rays of light into member 22 as the angle of incidence is equal to the angle of reflection.

It will be understood that in addition to certain direct light falling upon the standard and sample, that many of the light rays emanating from bulbs 24 will be radiating and reflected back and forth in the sphere so that the same are diffused. Other forms of enclosures might be utilized.

A slide mechanism generally indicated in Fig. 3 as 50, is provided and preferably accommodates two light filters: one, a daylight correction filter 52, and the other a neutral density filter 54, both filters being of adjusted density so as to transmit equal intensities of light. This equalizes the filters and gives a true standard of comparison. Other filters such as monochromatic, may of course be also utilized if desired.

It will be recognized that the precise arrangement of parts described herein above is particularly advantageous and efficient and that my visual color comparator as above described can be easily and efficiently fabricated, but it will be further recognized that various modifications or rearrangements in whole or in part and the use of certain parts or elements of my invention without other portions thereof, will occur to those skilled in the art and therefore, reference should be had to the appended claims for the scope of my invention.

I claim:

1. In a visual color comparator for comparing a sample and a standard, a light diffusing enclosure having a highly reflective interior surface, a source of illumination for the interior of said enclosure, an eye-port at one side of the enclosure aligned with an aperture at the other side of the enclosure, a shielding member between said eye-port and said source of illumination, and two independently retractable platform members of substantially equal size and together at least equalling the size of said aperture and positioned therebelow for holding a sample and a standard for observation, said platform members being directly adjacent one another.

2. A structure as defined in claim 1 wherein the said shielding member comprises a tubular elongated member projecting a substantial distance interiorly of the enclosure and connected thereto.

3. A structure as defined in claim 1 which additionally includes daylight correction and neutral density filter means associated with said viewing port.

4. A structure as defined in claim 1 wherein the enclosure is generally spherical.

5. In a visual color comparator for comparing a sample and a standard, a light diffusing enclosure having a highly reflective interior surface, a source of illumination for the interior of said enclosure, an eye-port at one side of the enclosure aligned with an aperture at the other side of the enclosure, and two independently retractable platform members of substantially equal size and together at least equalling the size of said aperture and positioned therebelow for holding a sample and a standard for observation, said platform members being directly adjacent one another.

EMANUEL M. ZELONY.